US006978255B1

(12) United States Patent
Pauschinger et al.

(10) Patent No.: US 6,978,255 B1
(45) Date of Patent: Dec. 20, 2005

(54) METHOD FOR PROTECTING A DEVICE AGAINST OPERATION WITH UNALLOWED CONSUMABLES AND ARRANGEMENT FOR THE IMPLEMENTATION OF THE METHOD

(75) Inventors: Dieter Pauschinger, Berlin (DE); Wolfgang Thiel, Berlin (DE); Olaf Turner, Berlin (DE); Harald Windel, Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 259 days.

(21) Appl. No.: 09/723,029

(22) Filed: Nov. 27, 2000

(30) Foreign Application Priority Data

Nov. 26, 1999 (DE) ................................ 199 58 941

(51) Int. Cl.[7] ................................ G06F 17/60
(52) U.S. Cl. ................................ 705/61; 705/50; 705/55; 347/32; 399/12
(58) Field of Search ................................ 705/400–413, 705/62, 50, 61; 347/32

(56) References Cited

U.S. PATENT DOCUMENTS 4,196,625 A 4/1980 Kern
5,075,724 A 12/1991 Wada et al.
5,132,729 A 7/1992 Matsushita et al.
5,303,005 A 4/1994 Takano et al.
5,305,199 A 4/1994 LoBiondo et al.
5,365,312 A 11/1994 Hillmann et al.
5,524,758 A * 6/1996 Lupul ...................... 206/459.5
5,638,442 A 6/1997 Gargiulo et al.
5,710,721 A 1/1998 Rieckhoff et al.
5,771,348 A 6/1998 Kubatzki et al.
5,821,975 A 10/1998 Günther et al.
5,929,884 A 7/1999 Hetzer et al.
5,930,553 A 7/1999 Hirst et al.
5,940,103 A 8/1999 Hetzer et al.
5,946,520 A * 8/1999 Hooper et al. ................ 399/12
5,991,673 A * 11/1999 Koopman et al. ............ 701/32
6,059,402 A 5/2000 Martens
6,154,619 A * 11/2000 Boockholdt et al. .......... 399/24
6,178,410 B1 1/2001 Kunde et al.
6,226,463 B1 * 5/2001 Phillips et al. ................ 399/24
6,374,354 B1 * 4/2002 Walmsley et al. .......... 713/167
6,494,562 B1 * 12/2002 Walker et al. ................ 347/32

(Continued)

FOREIGN PATENT DOCUMENTS

DE 44 32 807 4/1995

(Continued)

*Primary Examiner*—Firmin Backer
(74) *Attorney, Agent, or Firm*—Schiff Hardin LLP

(57) ABSTRACT

In a method and apparatus for protecting a device against operation with unallowed consumables whose authenticity is checked in a remote data center, at least one code word is generated, an allocation to a specific consumable is stored in the form of a dataset with a reference code word, the consumable is aggregated with the generated code word, which has a predetermined relationship to the reference code word or to a group of reference code words that are stored in the data center. An operation for the replacement of a consumable in a device remote from the data center is detected and a communication connection is set up between the device and the remote data center and the code word aggregated with the consumable is communicated to the data center. The communicated code word is received in the data center and the authenticity of the consumable on the basis of a stored reference code word is checked at the data center, which transmits a message to the device after checking the code.

23 Claims, 3 Drawing Sheets

U.S. PATENT DOCUMENTS

| | | | | |
|---|---|---|---|---|
| 6,565,181 | B2 * | 5/2003 | Silverbrook | 347/19 |
| 2002/0030714 | A1 * | 3/2002 | Walker | 347/19 |
| 2003/0112419 | A1 * | 6/2003 | Silverbrook | 355/18 |
| 2003/0189607 | A1 * | 10/2003 | Bullock et al. | 347/5 |
| 2003/0197751 | A1 * | 10/2003 | Saruta | 347/19 |

FOREIGN PATENT DOCUMENTS

| | | | | | |
|---|---|---|---|---|---|
| DE | 195 49 376 | | | 9/1996 | |
| DE | 298 21 903 | | | 6/1999 | |
| DE | 198 38 913 | | | 10/1999 | |
| DE | 198 18 708 | | | 11/1999 | |
| DE | 199 00 686 | | | 7/2000 | |
| EP | 0 663 623 | | | 7/1995 | |
| EP | 0 720 916 | | | 7/1996 | |
| EP | 0 782 053 | | | 7/1997 | |
| EP | 0 825 564 | | | 2/1998 | |
| EP | 0 832 749 | | | 4/1998 | |
| EP | 925936 | A2 | * | 6/1999 | B41J 2/175 |
| EP | 0 927 639 | | | 7/1999 | |
| EP | 0 934 828 | | | 8/1999 | |
| EP | 0 956 962 | | | 11/1999 | |
| GB | 2354735 | A | * | 4/2001 | G03G 21/18 |
| WO | WO 98/04414 | | | 2/1998 | |
| WO | WO 99/48694 | | | 9/1999 | |

* cited by examiner

METHOD FOR PROTECTING A DEVICE AGAINST OPERATION WITH UNALLOWED CONSUMABLES AND ARRANGEMENT FOR THE IMPLEMENTATION OF THE METHOD

BACKGROUND OF THE INVENTION

1. Field of the Invention

The present invention is directed to a method for protecting a device against operation with unallowed consumables, and is also directed to an arrangement for the implementation of the method. The invention can be employed for replenishing consumables in a postage meter machine such as, for example, ink cartridges for ink jet printing units or thermal transfer inking ribbon cassettes or rotary printing drums.

2. Description of the Prior Art

Postage meter machines have been known since the 1920's and are still being constantly perfected. The printing principle has changed from original, purely mechanical solutions with printing drums to electronic solutions with thermal transfer or ink jet printing head. Beginning in the 1970's, microprocessors and electronic credit memories were utilized in the increasingly electronic controllers. A standard payment principle, "pay before", is based on a monetary sum, referred to as the credit amount, being debited from a customer account and administered in the postage meter machine. At every franking, this credit amount is reduced by the franked amount printed on the postal matter. The postage meter machine can be reloaded with a credit amount. At the same time, specific security measures have been developed that are intended to prevent or detect an unauthorized manipulation to the detriment of the manufacturer or the user or the mail carrier. The postage meter machine also uses (consumes) printing ink and the parts belonging to the printing technology wear, so that it is in the interest of the user and of the mail carrier to employ qualitatively high-grade, authorized material of the manufacturer. If, however, so-called pirate products are used, this influences the service life and printing quality of the machine. It is sometimes appropriate, however, for an original product to be recycled by the manufacturer. For example, authorized ink could be refilled into an original cassette for a printing device. Heretofore, however, it has not been possible to completely preclude opportunities for manipulation.

German PS 196 13 944 discloses an ink cassette with two approximately identically constructed ink reservoirs that is suitable for the JetMail® type of postage meter machine. One ink reservoir serves for disposal of ink collected during priming. The other ink reservoir serves for ink supply and in fact has an end of ink detection with two electrodes, but no protection against refilling with an ink not authorized by the manufacturer.

An end of ink detection with electrodes is known from German OS 27 28 283. Two electrodes for a comparative measurement and a separate electrode for a conductivity measurement for signalling the end of ink are introduced into the base of the ink reservoir. The transfer impedance between these electrodes is measured with an electronic circuit and is interpreted. The electrodes are arranged in troughs that are formed in the reservoir base. A pre-condition for the use of such an end of ink recognition is the employment of an electrically conductive ink. Protection against refilling with an ink other than the original ink is not possible.

Sensors for detecting the end of ink already supply the JetMail® system with an end signal—as a safety margin—when a maximum of 200 frankings are still possible in order to avoid an incompletely printed franking imprint, that has already been debited, due to lack of ink. Priming is not possible, however, because the end signal is usually emitted too late to re-order an ink tank.

Cassette-shaped containers with ink fluid, inking ribbon or toner are disclosed in U.S. Pat. No. 5,365,312, which have an integrated circuit chip with an electronic memory for a code identifying the reservoir, for an expiration date and other data, as well as with a counter in order to identify the consumption during printing by counting the individual print pulses. These rules correspond to the drops of ink that are printed out. The integrated circuit stores the current filling status and this can be read out and displayed by the printer controller. Since a reprogramming of the chip and a refilling of the container are not possible, the manufacturer cannot recycle the container.

German PS 196 13 945 discloses a device for preventing re-employment a container for the ink supply of an ink print head. An ink connecting line from the ink print head is docked to the container with a hollow needle via a rubber-elastic closure. One cover mechanism is irreversibly triggered by the hollow needle when the container is pulled off. A refilled ink reservoir can no longer be docked. Unfortunately, this solution also prevents the re-employment of containers filled with original ink. The used ink tanks only can be returned to the dealer or the manufacturer's service department for proper disposal. It is a disadvantage when even a recycled consumable offered by the manufacturer cannot be re-employed. The use of exactly copied pirated ink reservoirs, unfortunately, can not be avoided with this known arrangement. A distinction between original consumable and unauthorized copies thereof is required for that purpose. A consumable that was not checked by the manufacturer or approved by the manufacturer represents a risk to the legibility of the franking imprint. The franking imprint must be capable of being read visually and by machine by the postal authorities in order to be able to verify the payment of postage. Together with other components of the postage meter machine, the consumables employed must therefore be approved by the postal authorities.

European Application 730 974 discloses a solution specifically for thermal transfer inking ribbons. Markings (for example, a bar code at the start of the inking ribbon) are impressed on the inking ribbon by the manufacturer. A detection of this marking (for example, with an optical scanner) is automatically carried out after the insertion of the inking ribbon into the postage meter machine. The data content of the marking is communicated to the control unit of the postage meter machine and is compared to pre-stored reference codes. These reference codes have been non-volatilely stored in the postage meter machine at the manufacturer. In order to counter revelation of the codes, these codes are regenerated at certain time intervals, and can be rolled into the postage meter machine by remote data transmission from a data center of the manufacturer. Every code supplied by the data center also has a time limit, which prevents unauthorized use after the expiration of the predetermined time period. Counting the imprints is also known.

A disadvantage of the above method is the lack of synchronization between the output of the new codes for the consumables and the storing of the corresponding reference codes in the postage meter machine, and the unpredictable point in time of the purchase and installation of the consumables into the postage meter machine. Time overlaps thus necessarily occur, whereby consumables with old codes do not interact with the new reference codes stored in the postage meter machine. If more than one of the codes is declared valid in these transition times, the risk also increases that codes that have become known can be combined with unauthorized consumables without detection.

Another disadvantage is the lack of information for the manufacturer that a specific customer is attempting to employ unauthorized consumables. This information is acquired only by the postage meter machine, which then can react only in a pre-programmed way, for instance by refusing to frank. A flexible reaction to the customer, for example personal telephone contact on the part of the manufacturer combined with a limited-time permission to use the unauthorized material, is thus not possible.

German 198 38 913 discloses a method for originality testing of a product such as, for example, medications, foods and treats or electronics and software products that delivers a message to the manufacturer as to whether a specific customer is using an authorized or unauthorized product. The latter, however, can neither be rendered more difficult nor prevented. Consequently, a device can be operated with unauthorized consumables without legal consequences and disadvantages, particularly when the manufacturer is not necessarily informed thereof, and thus cannot immediately prevent a potential loss of quality.

Indicating an impending change of consumable via display is disclosed in German OS 195 49 376 wherein sensors are used for determining the remaining amount of inking ribbon on inking ribbon cassettes for a thermal transfer printer or to count the number of imprints with the controller of the thermal transfer printer.

Counting the imprints in piezo ink jet print heads cannot provide any information about the quantity of ink remaining in the ink tank because, given a low through medium number of frankings per day, the consumption of ink due to cleaning predominates, thereby reducing the number of possible imprints per ink tank fill. In piezo ink jet print heads, a large part of the ink is used in priming and cannot be resupplied to the head. It is also known to resupply the portion of the ink used during priming to the head. For dependable ink supply, it is therefore important to recognize the end of ink and signal this in time. Given a premature replacement or insertion of a refilled but not completely full ink tank, however, the remaining quantity of ink cannot be exactly determined. Whether a replacement has occurred in the interim thus cannot be determined in a simple manner.

SUMMARY OF THE INVENTION

An object of the invention is to provide a method for protection against employment of unallowed consumables in devices, that largely minimizes the employment of unallowed consumables. “Unallowed consumables” means expired, old consumables as well as those of poor quality from other manufacturers, particularly pirated products. The method should be applicable without modification for different consumables regardless of their nature. Attempts to employ consumables by non-authorized manufacturers also should be prevented. An arrangement for the implementation of the method should include means that at least recognize the change of consumable, the nature thereof, or optionally, the identifier thereof, and possibly the manufacturer as well. The refilling of authorized ink reservoirs with unauthorized ink also should be made more difficult.

The present invention achieves piracy protection for consumables based on authentification requirements, whereby a data center checks the authenticity. This represents a considerable logistic advantage to be able to protect different consumables with the same method, regardless of their nature.

To this end, in the inventive method and arrangement the manufacturer of the consumable generates at least one code that identifies the consumable. The allocation of the code to a specific consumable is stored in a data bank in the form of a dataset with reference code word, possibly with an identification number. The identification code characterizes the nature of the consumable. An aggregation of the consumable with the generated code word ensues at the manufacturer by the code word being attached to a consumable offered for sale, or is permanently allocated thereto by fastening or comparable measures. This includes marking the consumable with this code word, which can ensue in very different ways with physical or chemical measures dependent on the physical state of the consumable. This marker code word has a predetermined relationship to the reference code word or to a group of reference code words that are presently stored in the data bank in the data center of the manufacturer. A transmission of the code word aggregated to the consumable ensues after recognition of an operation of changing a consumable in a device remote from the data center and the setup of a communication connection to the remote data center. When there is agreement with the reference code word, for example, the authenticity can be checked in the data center by a comparison operation in the simplest case. When the check ensues in the data center, of course, a transmission of reference code words to the device and a specific evaluation hardware/software can be omitted.

The device, for example a postage meter machine, is inventively equipped with means for recognizing an operation for changing a consumable, for setting up a communication connection to the remote data center, for transmission of the code word aggregated to the consumable and for notifying the device. The device includes a microprocessor for implementing this procedure. The notification ensues as the result of a check of the code word with the reference code word that is implemented externally from the device. The microprocessor of the device is programmed:

- to recognize the change of a consumable;
- to display a message by display after said recognition and wait for the input of a code;
- to set up a communication connection to the remote data center for the transmission of the input code and the reception of a notification of the device after review of the code in the data center; as well as
- to modify the operation of the device when the notification is to the effect that the review of the code that ensued externally from the device did not yield an authentication of the consumable.

The latter is the case if there is no predetermined relationship with one of the reference codes stored remote, or given non-coincidence. An evaluation of a predetermined counter reading for the imprints occurs when sensors identify the occurrence of an ink tank cassette charge, and monitoring an ink level serves for indirect recognition of the change of an ink tank cassette.

DESCRIPTION OF THE PREFERRED EMBODIMENTS

Figure 1:
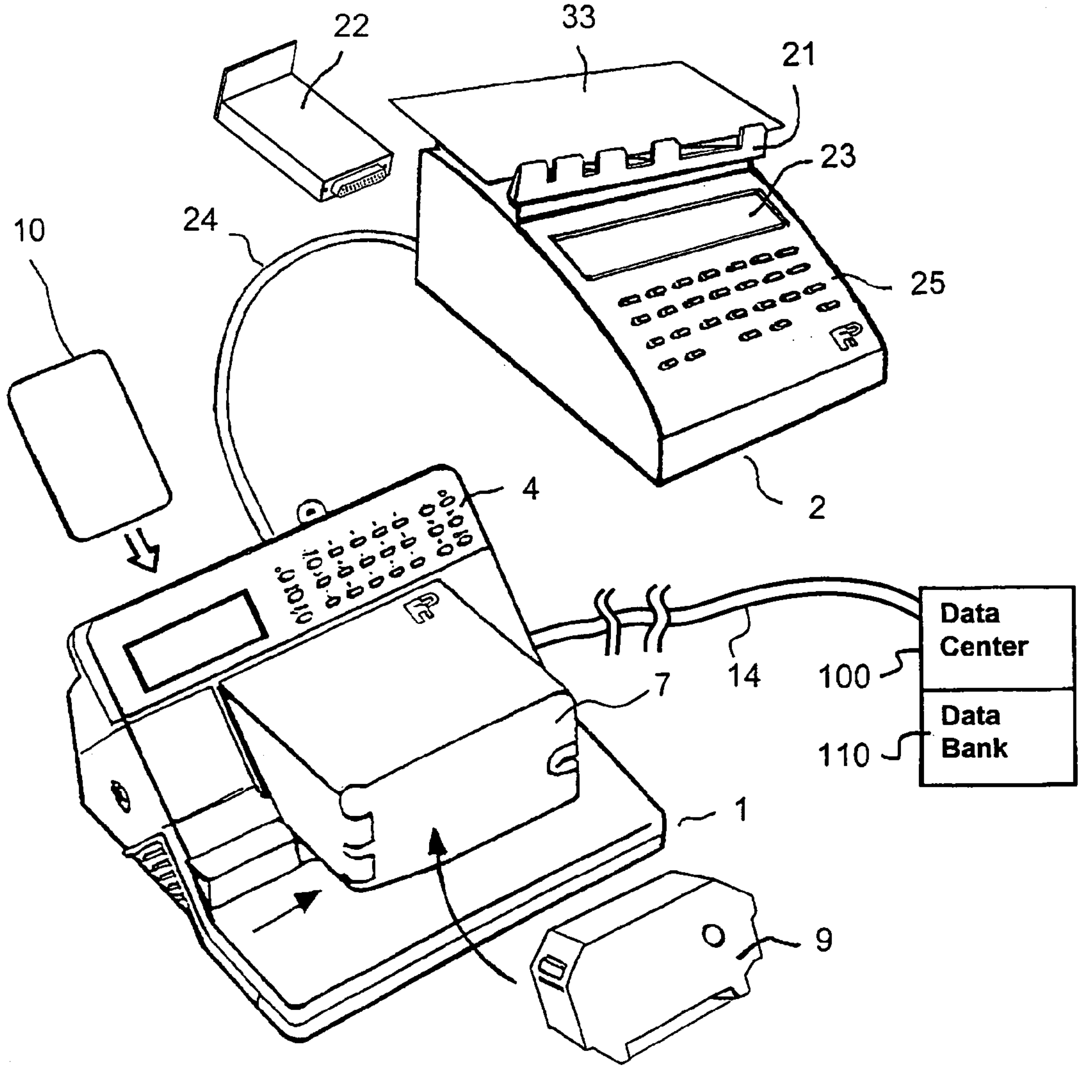
FIG. 1 is a perspective view of a postage meter machine of the type T1000 from the left front, in which the invention can be used.

A perspective view of a postage meter machine of the type T1000 manufactured by Francotyp Postalia AG & Co. is shown from the left front in FIG. 1. The postage meter machine 1 has an internal modem and, for example for recrediting, is connectable via a first data connection 14 to a data center 100 that has a data bank 130. A chip card 10 serves, for example, for setting the postage meter machine to a cost center under which the accounting is to be undertaken. The postage meter machine 1 has a cassette compartment 7 that must be opened for the insertion of a thermal transfer inking ribbon cassette 9. Upon opening before and/or when removing the cassette, which is detected by a sensor (not shown), a microprocessor in the postage meter machine 1 generates a display text and a warning appears on the display of a user interface 4. This text warns against removing a cassette 9 authorized by the manufacturer and continuing the operate the postage meter machine 1 with an unauthorized cassette, in order to prevent damage as well as premature aging of the printer mechanism and a qualitatively compromised print image. A marking is impressed as a bar code at the start of the inking ribbon. After the insertion of the new inking ribbon cassette into the postage meter machine, a detection of this marking is automatically implemented with an optical scanner (not shown) in order to communicate the data content of the marking to the control unit of the postage meter machine, as disclosed in European Application 730 974. Differing from the system disclosed in European Application 730 974, however, a communication is carried out between the control unit of the postage meter machine 1 and the data center 100 an authentic manufacturer's inking ribbon being recognized in the data center as a result thereof and the microprocessor being initiated therefrom to either display an OK message, or to emit an error message (CALL SERVICE) if the data center was incapable of recognizing an authentic manufacturer's inking ribbon. Physical identifiers are also conceivable, for instance gluing on a bar code label, that can be read with a simple scanner. The marking of the consumable with this code word can also ensue other different ways.

Figure 2:
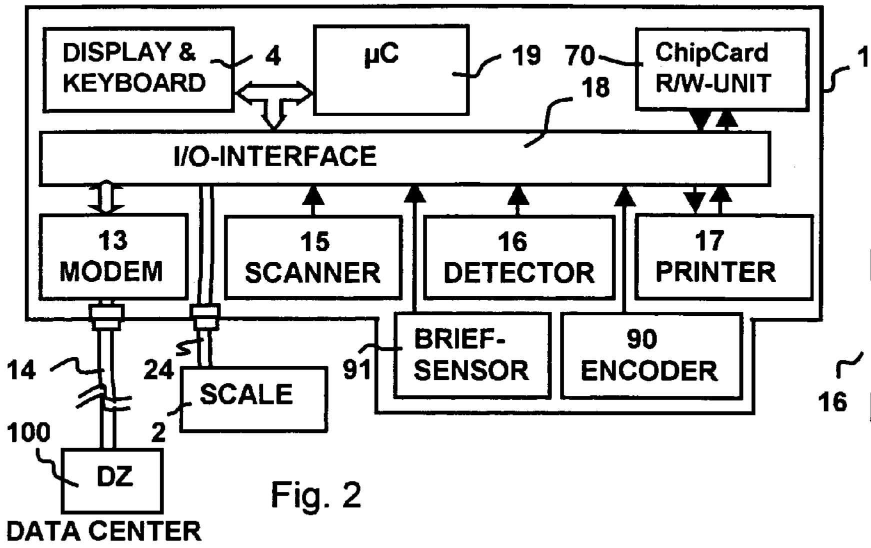
FIG. 2 is a block circuit diagram of the postage meter machine according to FIG. 1.

A block circuit diagram is explained on the basis of FIG. 2, for the postage meter machine 1 shown in FIG. 1 or to some other, arbitrary device. Such a device has a microcomputer ($\mu$P) 19 for the control of the user interface 4, comprising a keyboard and a display with controller. A modem 13 and a printer 17 and/or other actuators (not shown) are connected to the microcomputer 19 via an input/output interface 18. Further sensors such as an encoder 90 and a letter sensor 91 are also connected in a known way. Additionally, a scanner 15 or a comparable means for recognizing a code word at the consumable can be connected to the input/output interface 18. When the aforementioned device is a postage meter machine 1, a postage-calculating scale 2 can be connected to the input/output interface 18 via a cable 24 for data connection. A further data connection 14 serves for the connection of the modem 13 to the data center 100. The scanner 15 can be omitted when a code word is entered by user interface 4 and communicated to the data center 100 via the modem 13 and the data connection 14.

Figure 3:
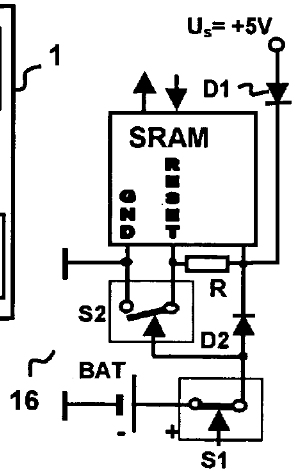
FIG. 3 is a circuit diagram of a detector in accordance with the invention.

FIG. 3 shows a circuit diagram of a detector that for detecting the removal or replacement of the consumable when the device is turned off and not supplied with system voltage $U_s$. The detector has a commercially obtainable lithium battery BAT that supplies a memory with a memory maintenance voltage of approximately 3 V. A first switch S1 is actuated upon removal or replacement of the consumable. For example, a mechanical contact is opened that interrupts the voltage supply of the memory from the lithium battery BAT. This voltage supply is detected and causes the closure of a second switch S2, that is preferably realized as a CMOS circuit. The reset input of the memory is thereby connected to ground (L level), which leads to the dependable erasure of the memory content of the memory. Otherwise, and with the device turned on, a positive voltage $U_s$=+4.5 through +5 V (H level) is present at the reset input via a resistor R and the diode D1, or—with the device turned off—a positive voltage $U_{BAT}$=+2.5 through +3 V (H level) is present via the diode D2. The memory can be fashioned as SRAM that is equipped with a code by the microcomputer 19 via the interface 18 by means of a shift register (not shown) and that can be queried with respect to the presence of the code.

The nature of the aggregation of the consumable to the code word is preferably dependent on the nature of the consumable. A sensor directly or indirectly allows the presence of consumable to be identified according to a physical interactive principle, if the consumable is a solid. For example, the consumable can be an inking ribbon for a postage meter machine 1 according to FIG. 1.

Figure 4:
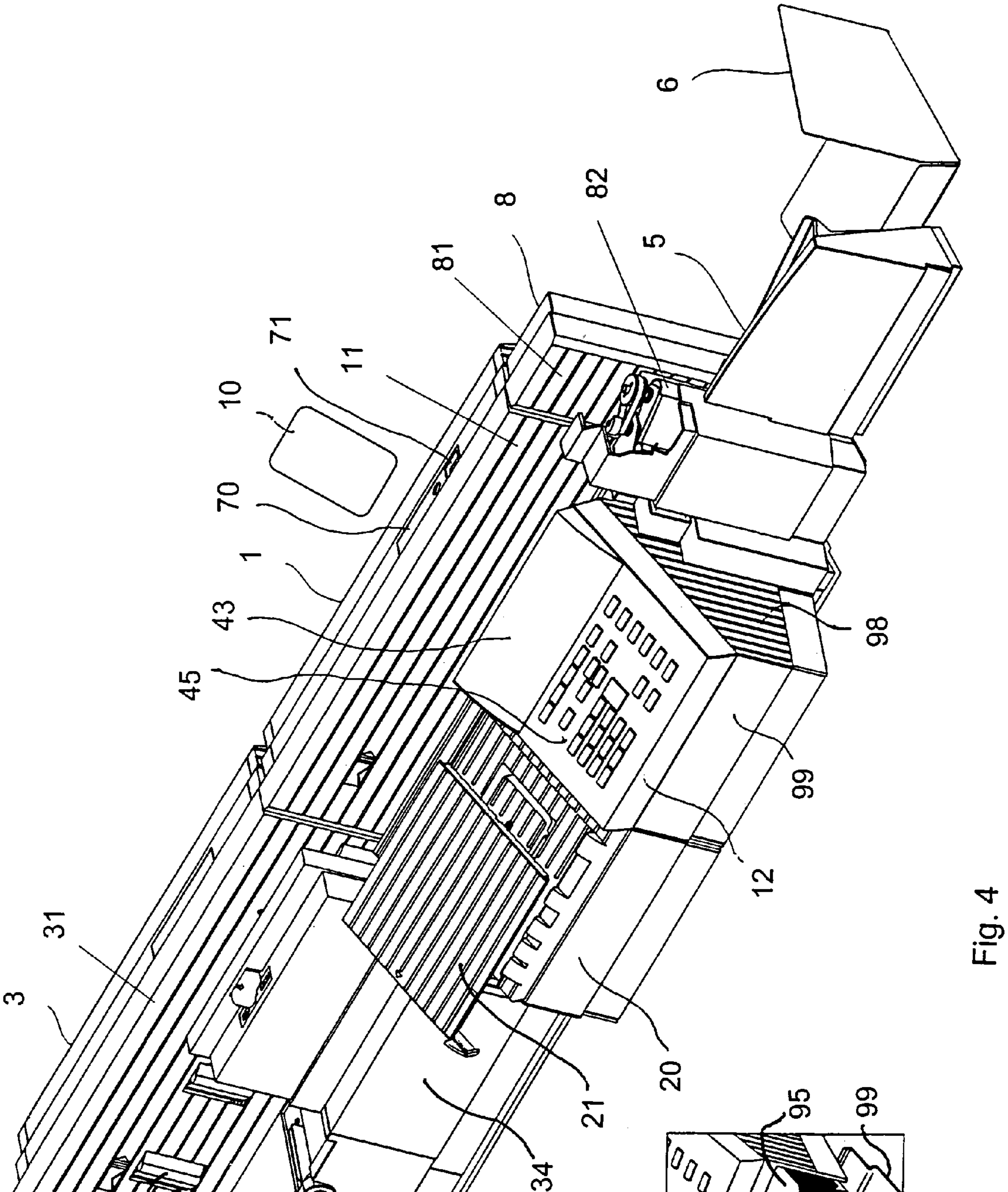
FIG. 4 is a perspective view of a postage meter machine of the type JetMail® from the right front in which the invention can be used.

It is provided for a postage meter machine according to FIG. 4 that the consumable is an ink tank filled with ink. For a different postage meter machine (not shown) the consumable is an ink jet print head with integrated ink tank or, respectively, a cartridge. For example, Siemens type DHP50 is such a disposable print head.

Fundamentally, the inventive solution can be applied in postage meter machines of other types, for example in a postage meter machine with print drum, wherein the consumable is ink. After a cover has been opened, ink can be replenished from a bottle or an ink cartridge. The code word is printed on the bottle or ink cartridge or is printed on a label that is secured to the latter. A postage meter machine Type EFS with a printing drum has an inking unit with a step-shaped covering that enables a simple refilling of the print stamp ink and prevents an unintended emergence of the print stamp ink (European Application 269 883). The ink flows from a screwed-on cartridge into an ink chamber and is conveyed to the printing drum with rollers. In an especially simple version proceeds therefrom that the code word is supplied together with the consumable as a visually legible number, and the user must type in the number by actuating corresponding operating elements. The advantage of a semi-automatic solution is (a) the elimination of the outlay for a scanner in the postage meter machine, and (b) protection of the consumable, ink, enabled for the first time as a result of the invention.

This solution likewise assumes the presence of a modem and a sensor that recognizes the replacement or the use of a new consumable. The postage meter machine has a sensor and a control unit with a processor that is programmed to generate a message after the recognition, and to display it and to wait for the input of a number that is communicated to the data center by modem as the code word.

For some peripheral device, for example, the consumable is in a non-solid aggregate state. For a peripheral device, for example, the consumable can be a specific fluid for a letter moistener and sealer. The latter can be a component of an automatic feeder means for letters. Usually, however, at least one container is present that is a solid body and can be provided with a marking.

Another version employs a chip in which the code word is stored and can be read out by producing a connection, for example via electrical contacts, given installation of the new consumable.

A postage-calculating scale 2 (shown in FIG. 1) has a weighing pan 21, a display 23 and a keyboard 25 for the entry of shipping information about a letter 33 to be dispatched. When there is a further data connection 24 between the postage-calculating scale 2 and the postage meter machine 1, the scale 2 can send the weight, the postage value and other data to the postage meter machine 1, and can also send a message to the remote data center 100 via the modem of the postage meter machine 1, for example to identify which rate PROM is being employed for calculating the postage value. The latter is located within a memory insert card 22 that can be plugged in the postage-calculating scale 2. On the basis of data stored in a data bank 110, the data center 100 can distinguish whether an authorized or a non-authorized postage rate table is being employed in the postage-calculating scale 2.

In the perspective view from the right of a JetMail® type postage meter machine shown in FIG. 4, there is an internal data connection to the integrated scale 20 whose rate PROM (not shown) can be basically checked in the same way as, for example, an arbitrary other component that is present in modularly removable form, and has a memory.

An automatic feeder 3 with integrated separating mechanism is arranged upstream of the postage meter machine 1. A pressure bow 35 can be hinged up and then presses against a stack of mail from which letters are separated with haul-off rollers 32. Further parts of the separating mechanism is situated under a hood 34. A letter lies against a guide plate 31 and is moved downstream to the guide plate 11 of the postage meter machine 1 where the printing event franking ensues. A franked letter that is conveyed farther lies against a guide plate 81 of a closing module 8. A closing roller pair 82 closes envelopes that have not yet been completely closed and ejects the envelopes via an insert 5 into the deposit box 6. The structure of the JetMail® type postage meter machine has been disclosed in greater detail in, for example, German Patent Application DE 199 00 686.5-27.

A chip card write/read unit 70 and an on/off switch 71 are arranged in the guide plate 11 of the postage meter machine 1. After being turned on, a chip card 10 can be employed in combination with the user interface 43, 45 for simplified setting of the postage meter machine. The user interface 43, 45 is situated on the meter 12 of the postage meter machine 1. An internationally usable user interface has been set forth in greater detail in German Utility Model 298 21 903.

Figure 5:
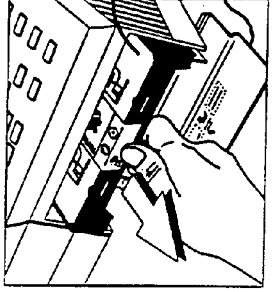
FIG. 5 illustrates of changing of the ink tank in the postage meter machine of the type JetMail® in accordance with the invention.

A microprocessor (not shown) of the postage meter machine 1 monitors the filling level of an ink tank 95 (shown in FIG. 5) with an end of ink sensor 92. The latter can be in contact with two electrodes according to German Patent 196 13 944. In the JetMail®, such sensors—to be on the safe side—already supply an end signal when a maximum of 200 frankings are still possible in order to avoid an incompletely printed franking print image due to lack of ink. As warranted, the microprocessor generates a display text for display in the display 43: THE INK SUPPLY HAS BEEN NEARLY USED UP. PLEASE REPLACE THE INK TANK AS SOON AS POSSIBLE! IMPRINT RESERVE: 200.

The postage meter machine 1 then can continue to be operated with the quantity of reserve ink. In its memory space, the microprocessor has a down counter that is preset to the number 200 by the end of ink signal and that is decremented by one upon every further franking. The number 200 is derived empirically from values for a remainder of possible imprints and a safety factor. The number identifying the remainder can be displayed before the next franking. After every further franking, the microprocessor generates a status line that indicates the number of remaining imprints and, at the end, outputs the message: THE INK SUPPLY HAS BEEN USED UP. PLEASE CHANGE THE INK TANK.

After opening the flap 99 of the ink compartment 98, the used ink tank 95 can be removed and placed into a plastic bag that collects ink residues that may leak out. A new ink tank can be taken from its package and checked to see whether the color of the ink is right. A perforation encoding on the back side of the ink tank can be utilized for this purpose. The new code word can be read at the same time. The ink tank is placed into lateral guide rails (not shown) of the ink tank compartment and pushed in until it noticeably engages. As long as the ink tank has not been properly inserted, the microprocessor generates the message: THE INK TANK IS MISSING!

A contact is automatically closed when the new consumable is docked. As a result of this contact, the postage meter machine 1 recognizes that a new consumable has been installed. Dependent on a perforation encoding at the back side of the ink tank, the original ink type (postal red, fluorescent red, etc.) can be detected with suitably fashioned contacts. The microprocessor 19 now generates a messages that prompts the customer to input the new code word: INPUT CODE WORD. For example, the customer can take this code word from an imprint on the package and can input it into the postage meter machine 1 with the keyboard 45.

Now that the postage meter machine 1 has the new code word available to it, a connection is set up to the data center of the manufacturer. Modem postage meter machines are all already equipped with a modem in order to be able to communicate with the manufacturer's data center. This normally serves for having a credit loaded from the data center when the credit memory becomes exhausted. The transmission of the code words can ensue separately immediately after the detection of the new consumable or can be an additional component of the communication for the periodic remote crediting of the postage meter machine at a later time. Known measures for data protection are utilized in order to prevent the code words from being tapped on the transmission link. The data center receives the code word of the new consumable 95 together with an identifier of the postage meter machine 1. The matching code word is sought in the group of stored reference code words. When it is found, the logged-on consumable is considered authorized and nothing opposes continued employment of the postage meter machine 1. If the code word is not identified, a counterfeit code word or a code word that is no longer valid must be assumed. Given a counterfeit code word, the customer has obviously acquired a non-authorized consumable with an arbitrary, pseudo code word, or created the code word due to a lack of a true code word when requested to enter the code word. Given a code word that is no longer valid, a check is carried out to see whether this was already employed. When the answer is 'no', this can mean an authorized but expired consumable. In this case, a check should be carried out to determine whether the material can still be permitted to be used. When the invalid code word has already been employed, it is obviously an attempted manipulation.

Figure 6:
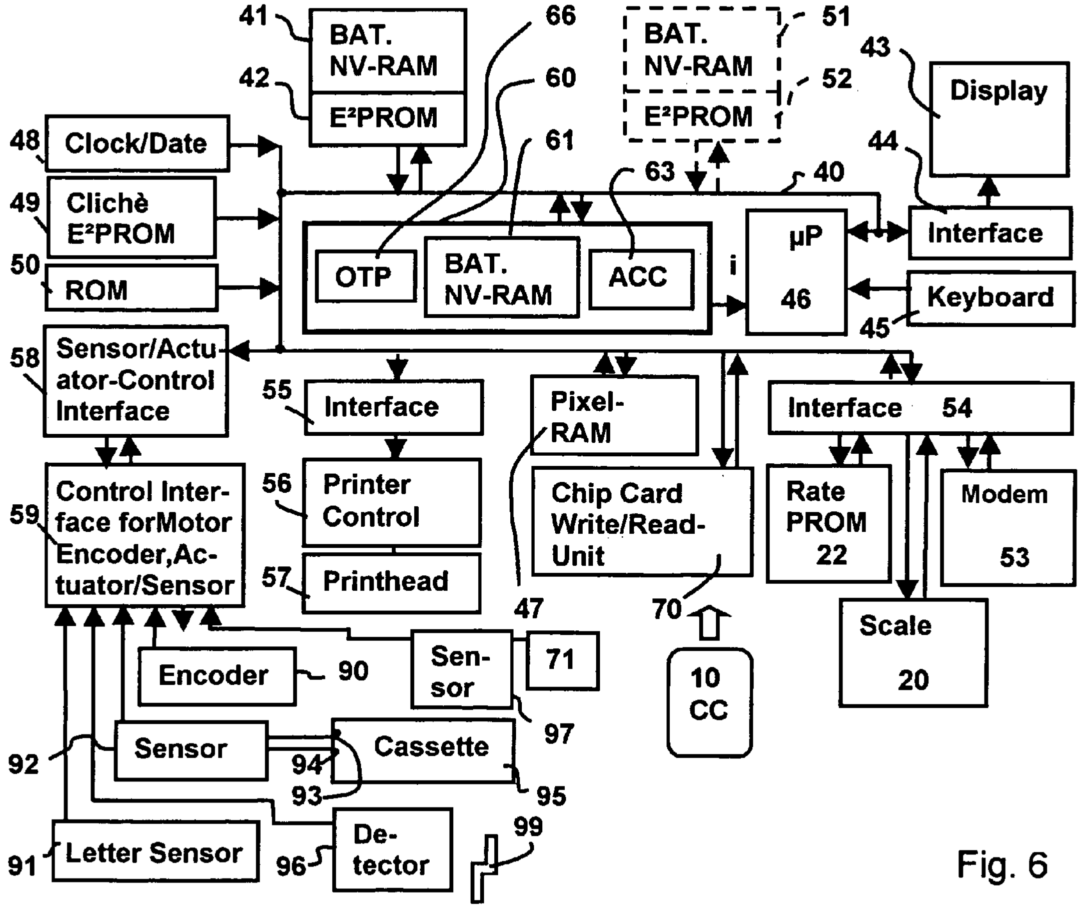
FIG. 6 is a block circuit diagram of the postage meter machine of the type JetMail®.

FIG. 6 shows a block circuit diagram of the JetMail® type postage meter machine with a control unit 40 through 58 comprising a processor 46 and with a base including an integrated scale 20, a rate PROM 22, a modem 53 and a detector 96 that detects the changing or the employment of a new ink tank cassette 95. Alternatively, the rate PROM 22 can also be realized in the broken-line memory module 51, 52 within the meter.

Alternatively, the direct measuring method with the detector 96 can be replaced by an indirect measuring method that uses the existing sensors 92 and 97. After a consumption of the ink, a predetermined remainder of ink is detected with the electrodes 93, 94 and the sensor 92 and communicated to the microprocessor 46 via the assemblies SAS 59, sensor/actuator control interface ASIC 58, the microprocessor 46 subsequently generating a display. A predetermined remainder of ink remains that suffices for approximately 200 imprints when the conductivity between the contacts 93, 94 falls below a predetermined threshold. A turn-on/off of the postage meter machine 1 via the switch 71 can be detected via the sensor 97, which is likewise connected to the SAS 59. A shutdown at the time during which the postage meter machine only has the ink remainder available to it can indicate an impending replacement. An end of ink can be determined by a comparison of the counted imprints to a limit value or by counting down from a predetermined plurality. When, following a re-activation without a replacement detected via the contacts 93, 94 and the sensor 92 for restored conductivity between the contacts 93, 94, the postage meter machine can continue to be operated beyond a number of, for example, 200 imprints, then this is an indication that ink was refilled in an unauthorized fashion in the interim. As a reaction thereto, at least a display message is generated and a message also may be communicated to the date center when a credit must be reloaded.

A security module 60 serves as first accounting module and has a hardware accounting unit 63 and a battery-supported non-volatile memory 16 into which a credit can be loaded by modem 53. An OTP (One-time programmable) processor 66 thereby implements security routines both in the credit reloading as well as for securing the register data with a MAC (Message authentication code). The advantage of the security module is comprised therein that the check of the dependability and the approval of the inventive franking and posting machine, which is carried out by the mail carrier, is then only required for the appertaining processor system 60 and the connected printer module 55–57. A second processing module is formed by the chip card 10 in combination with the chip card write/read unit 70. The microprocessor 46 and the first memory components 41, 42 then form a third processing module, and the microprocessor 46 and the second memory components 51, 52) broken lines) then form a fourth processing module, etc. As a rule, one accounting module suffices and the other processing modules can assume other tasks.

The microprocessor 46 with the appertaining memories 41,42 is programmed for counting the imprints in combination with the recognition of a change of the ink cassette and is also employed as postage computer and for the print control. The accounting module 60 serves for accounting and for calculating encryption codes at least for the communication with the data center for the purpose of credit reloading. The accounting module 60 has been developed to form the security module on the basis of this division of tasks. All processing modules 41, 42 and 51, 52, the security module 60, the microprocessor 46, the interface assemblies 44, 54 and 55, a main working memory pixel-RAM 47, clock/date module 48, slogan memory EEPROM 49, program memory ROM 50 and an ASIC with the sensor/actuator interface 58 are connected to a meter-internal bus 40 of the controller. An input at the ports of the microprocessor 46 for the corresponding control of the postage meter machine 1 is actuated with the keyboard 45. A generated screen image can proceed to the display via the interface assembly 44. The display has an integrated controller for support.

Further sensors and actuators (not explained in greater detail herein) of the base, an encoder 90 for weighing a letter and at least one letter sensor 91 as well as—via the interface 54—at least the modem 53 are electrically connected to the meter 12 of the postage meter machine 1 via the sensor/actuator control interface 58. Both interface circuits 54 and 58 can be realized in an application circuit ASIC. Further details about this can be derived from European Application 716 398. Further details about the control of the other components in the base and in the periphery can be derived from European Application 875 864.

The modem 53 is electrically connected to the meter 12 of the postage meter machine 1 via the interface 54. Another advantage is achieved due to the comparison of the code words carried out in the remote data center 100 (not shown). Even given a valid code word, a check is carried out to determine whether it was already previously used. If it was reported from a different postage meter machine, the user thereof obviously gave the code word and the new customer is attempting to employ unauthorized consumables in combination with this code word. If the customer has already previously indicated the code word, this is an indication that, following the use of authorized consumables, the customer has now gained possession of unauthorized consumables.

The range of possible responsive measures extends from a cordial telephone admonition to the dispatching of a service technician with an original consumable, up to a remote disable of the postage meter machine 1, for example given a repeat offender.

The advantage of this method is that there are no "old" code words that are no longer valid and that could undermine the security system by being passed on. This is achieved because the check of the code words does not occur in the individual postage meter machine 1 that is not networked to another machine, but proceeds remote therefrom at the level of the data center, which has access to all assigned code words and is also always loaded with the corresponding reference code words synchronously with newly produced consumables. The data center described herein can be remote from a data center for credit reloading but is connected to the latter. Another advantage is the elimination of the necessity of issuing new codes at specific time intervals and invalidating the old ones, with more than one set of code words always being valid during the transition times. No memory space requirement in the postage meter machine 1 for storing one or more sets of code words arises in the inventive solution.

Another advantage of the method is the possibility of acquiring information about the kind of manipulation. For example, it is possible to not only identify the customer who is attempting to employ the unauthorized consumable at the moment but also to identify the source from which the offender probably obtained a valid code word.

In the scope of this inventive method, an effective protection against refilling ink tanks is also possible. The ink tank need not necessarily be removed from the device in this unauthorized refilling with any old ink. On the contrary, it is also conceivable that the ink is injected into the stationary tank with a syringe. In this case, no contact would be triggered that indicates the replacement of the consumable and consequently prompts the customer to input the new code word. The following modification is a deterrent.

Let it be assumed that the customer has first acquired authorized consumables; this is at least assured when purchasing the postage meter machine 1. Subsequently, the data center has received the code word of the authorized consumable in the above-described way. At the same time, a counter for this machine is started in the data center. This registers the time until the next credit reloading. At the next credit reloading, the item count is transmitted from the postage meter machine 1 into the data center, this indicating how many frankings were carried out since the last credit reloading. The consumable is designed for a specific number of franking imprints that is subject to only a slight fluctuation when priming is not carried or only a little priming is carried out (for example, JetMail tank for 30,000 frankings+/−5%). The point in time of the acquisition of the consumable then divides the time period between two credit reloadings in a specific relationship. The ink consumption must also correspond to this relationship if the user behavior has not fundamentally changed. The relationship calculation, however, also can extend over more than one period of credit reloadings and gains in precision. If significantly more frankings have been implemented in this time span than would have been possible at all with the most recently reported consumable, this is an indication that, without replacing the ink cartridge, this was apparently refilled with unauthorized ink, quod erat demonstratum. This enables an evaluation in the data center in view of suspect machines that can be inspected in targeted fashion in future by the service technician.

A check of the authorization of the consumable can fundamentally also ensue only in the postage meter machine. A transmission of the code words immediately after determination of the new consumable or as an additional component part of the communication for periodic remote loading of the postage meter machine at a later time continues to be required. The data center receives the code word of the new consumable 95 together with an identifier of the postage meter machine 1. A search for the matching code word is made in the group of stored reference code words. A reference code word that has been found is then communicated to the postage meter machine. Known data protection measures are utilized in the communication in order to prevent the code words from being tapped on the transmission link. A check is carried out in the postage meter machine to determine whether the two, i.e. the code word and the reference code word, have a predetermined mathematical relationship to one another. When this is the case, the reported consumable is considered authorized and nothing opposes continued use of the postage meter machine 1.

The advantage of this version is that, even given interruption of the communication with the data center, the postage meter machine can independently implement the comparison and enable or block itself, or modify its operation in some other, suitable way, so that a use of refilled, authorized ink reservoirs with unauthorized ink is at least deterred. A check of the authorization of the consumable can also fundamentally ensue in both, i.e. in the data center and, additionally, in the postage meter machine.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for protecting a device against operation with an unallowed tangible consumable product, comprising the steps of:

(a) storing a plurality of reference code words at a data center;

(b) generating a code word having a predetermined relationship to at least one of said reference code words;

(c) electronically allocating said generated code word to an electronic representation of a tangible consumable product and storing said electronic allocation at said data center;

(d) aggregating each physical authentic tangible replacement consumable product, corresponding to said electronically represented tangible consumable product, with said generated code word, by generating an identification number embodying said generated code word and aggregating the identification number with each physical authentic tangible replacement consumable product during manufacture of each authentic tangible replacement consumable product at a manufacturer;

(e) at a device located remote from said data center, detecting an operation to replace tangible consumable product in said device with a proposed tangible replacement consumable product, said proposed tangible replacement consumable product having an identification number aggregated therewith embodying a code word;

(f) upon detection of said operation, automatically establishing a communication link between said device and said data center and communicating said identification number aggregated with said proposed, tangible replacement consumable product to said data center from said device via said link;

(g) at said data center, checking authenticity of said proposed, tangible replacement consumable product by determining whether said code word embodied in the identification number aggregated with said proposed, tangible replacement consumable, and transmitted via said link, has said predetermined relationship with said at least one reference code word stored at said data center and if so, authorizing said proposed, tangible replacement product; and (h) via said link, informing said device from said data center whether said proposed, tangible replacement consumable is authorized.

2. A method as claimed in claim 1 wherein step (d) comprises designating said identification number embodying said generated code word on a carrier and permanently affixing said carrier to each authentic, tangible replacement consumable.

3. A method as claimed in claim 1 wherein step (d) comprises applying said identification number embodying said generated code word on each authentic, tangible replacement consumable as a marking.

4. A method as claimed in claim 1 wherein step (d) comprises selecting a technique for aggregating each authentic, tangible replacement consumable product with said identification number embodying said generated code word dependent on a physical nature of said authentic, tangible replacement consumable.

5. A method as claimed in claim 1 wherein said device is a franking machine which is loaded with a credit that is decremented upon each franking performed at said franking machine, and wherein said method comprises the additional step of maintaining a record of a credit status of said device at said device, and wherein step (f) includes transmitting a current credit status of said device to said data center via said data link together with said identification number embodying said code word aggregated with said proposed, tangible replacement consumable product, and wherein step (g) comprises determining, at said data center an amount of credit used by said device since an immediately preceding authorization of said tangible replacement consumable product, and from said determination of said credit used by said device, determining at said data center a number of flankings performed by said device since said immediately preceding authorization, and classifying said device as suspect dependent on a relationship between said number of flankings.

6. In a device which consumes a tangible consumable product during operation thereof, the improvement of an arrangement for protecting said device against operation with an unallowed tangible consumable product, said arrangement comprising:

a detector which generates a detector signal upon detecting an operation for replacing a currently used tangible consumable product with a proposed, tangible replacement consumable product having an identification number aggregated therewith;

a microprocessor supplied with said detector signal which, upon receipt of said detector signal, automatically establishes a communication link with a remote data center;

an input unit that enters said identification number aggregated with said proposed, tangible replacement consumable product into said microprocessor, and said microprocessor thereupon communicating said identification number to said remote data center; and said microprocessor, via said communication link, receiving a message from said data center identifying whether said proposed, tangible replacement consumable product is authorized, and said microprocessor modifying operation of said device, with regard to permitting usage of said proposed, tangible consumable product in said device, dependent on said message.

7. An arrangement as claimed in claim 6 wherein said tangible consumable product is a liquid.

8. An arrangement as claimed in claim 6 wherein said tangible consumable product is ink.

9. An arrangement as claimed in claim 6 wherein said tangible consumable product has a non-solid aggregate state.

10. An arrangement as claimed in claim 6 wherein said tangible consumable product is a solid.

11. An arrangement as claimed in claim 6 wherein said tangible consumable product is an inking ribbon.

12. An arrangement as claimed in claim 6 wherein said tangible consumable product is an ink jet print head with an integrated ink tank.

13. An arrangement as claimed in claim 6 wherein said tangible consumable product is a filled ink tank cassette.

14. An arrangement as claimed in claim 6 wherein said detector comprises a sensor which detects a presence of said proposed, tangible replacement consumable product by physical interaction with said proposed, tangible replacement consumable product.

15. An arrangement as claimed in claim 6 wherein said device is a printing device having a printer which produces a plurality of imprints, and wherein said tangible consumable product is a filled ink tank cassette connected to said printer, each of said imprints consuming ink from said ink tank cassette, and wherein said microprocessor counts said plurality of imprints to obtain an imprint count as an indication of an amount of ink remaining in said ink tank cassette.

16. An arrangement as claimed in claim 15 wherein said microprocessor determines a need for replacement of said ink tank cassette when said imprint count reaches a predetermined number.

17. An arrangement as claimed in claim 6 wherein said device is a printing device having a printer for printing a plurality of imprints and wherein said tangible consumable product is a filled ink tank cassette connected to said printer, each of said plurality of imprints consuming ink from said ink tank cassette, and wherein said detector comprises electrodes which electrically interact with said ink in said ink tank cassette to identify an amount of ink remaining in said ink tank cassette.

18. An arrangement as claimed in claim 17 wherein said ink tank cassette has an identifier thereon identifying a type of ink contained in said ink tank cassette, said identifier being enterable into said microprocessor.

19. An arrangement as claimed in claim 6 wherein said microprocessor modifies operation of said device by disenabling further operation of said device if said message indicates said proposed, tangible replacement consumable product is not authentic.

20. An arrangement as claimed in claim 6 wherein said device further comprises a display in communication with said microprocessor, and wherein said microprocessor causes said message from said data center to be displayed on said display.

21. A method as claimed in claim 1 wherein step (d) comprises storing said identification number embodying said generated code word in an electronically readable chip and permanently associating said chip with said authentic, tangible replacement consumable product, and wherein step (f) includes inserting said proposed, tangible replacement consumable product in said device and reading said code word embodied in said identification number aggregated therewith from said electronically readable chip.

22. A system for protecting a device in the system against operation with an unallowed tangible consumable product comprising:

a device which consumes a tangible consumable product during operation thereof;

a data center located remote from said device and having a microprocessor and a memory accessible by said microprocessor, said memory containing a code word, having a predetermined relationship to a reference code word also stored at said data center, said code word being electronically allocated in said memory to an electronic representation of said tangible consumable product;

a detector at said device for detecting an operation at said device to replace said tangible consumable product in said device with a proposed, tangible replacement consumable product, said proposed, tangible replacement consumable product having an identification number aggregated therewith;

a device microprocessor at said device connected to said detector for, upon detection of said operation by said detector, automatically establishing a communication link with said microprocessor at said data center and communicating said identification number aggregated with said proposed, tangible replacement consumable product to said data center from said device via said link;

said microprocessor at said data center checking authenticity of said proposed, tangible replacement consumable product by determining whether said identification number embodies a code word having the same predetermined relationship with said reference code word as the code word stored in the memory of the data center allocated to the electronic representation of the tangible consumable product and, if so, authorizing said proposed, tangible replacement product; and said microprocessor at said data center, via said link, informing said device microprocessor whether said proposed, tangible replacement consumable product is authorized.

23. A system as claimed in claim 22 wherein said device is a franking machine which is loaded with a credit that is decremented upon each franking performed at said franking machine, and wherein said device microprocessor maintains a record of a credit status of said franking machine and transmits said credit status from said franking machine to said data center via said link together with said identification number, and wherein said microprocessor at said data center determines, from the transmitted credit status, an amount of credit used by said franking machine since an immediately preceding authorization of said tangible replacement consumable product, and from said determination of said credit used by said franking machine, said microprocessor at said data center determines a number of frankings performed by said franking machine since said immediately preceding authorization, and classifies said franking machine as suspect dependent on said number of frankings.

* * * * *